US011882031B2

(12) United States Patent
Peng et al.

(10) Patent No.: US 11,882,031 B2
(45) Date of Patent: Jan. 23, 2024

(54) PACKET HEADER INFORMATION OBTAINING METHOD, PACKET GENERATION METHOD, DEVICE, AND STORAGE MEDIUM

(71) Applicant: HUAWEI TECHNOLOGIES CO., LTD., Shenzhen (CN)

(72) Inventors: Shuping Peng, Beijing (CN); Yang Xia, Beijing (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/192,037

(22) Filed: Mar. 29, 2023

(65) Prior Publication Data

US 2023/0231805 A1 Jul. 20, 2023

Related U.S. Application Data

(63) Continuation of application No. PCT/CN2021/120790, filed on Sep. 26, 2021.

(30) Foreign Application Priority Data

Sep. 30, 2020 (CN) .......................... 202011066254.5

(51) Int. Cl.
  *G06F 15/16* (2006.01)
  *H04L 45/00* (2022.01)
  *H04L 45/741* (2022.01)

(52) U.S. Cl.
  CPC ............ *H04L 45/566* (2013.01); *H04L 45/38* (2013.01); *H04L 45/741* (2013.01)

(58) Field of Classification Search
  CPC ...... H04L 45/03; H04L 45/566; H04L 45/741
  USPC ........................................................ 709/238
  See application file for complete search history.

(56) References Cited

U.S. PATENT DOCUMENTS

| 8,135,657 | B2 * | 3/2012 | Kapoor | .................. H04L 67/62 706/45 |
| 9,800,608 | B2 * | 10/2017 | Korsunsky | .............. G06F 21/55 |
| 10,469,379 | B2 * | 11/2019 | Bosch | .................. H04L 45/741 |
| 10,511,573 | B2 * | 12/2019 | Larson | .................... H04L 63/10 |

(Continued)

FOREIGN PATENT DOCUMENTS

WO 2015026132 A1 2/2015

*Primary Examiner* — Moustafa M Meky
(74) *Attorney, Agent, or Firm* — Maier & Maier, PLLC

(57) ABSTRACT

A packet header information obtaining method. The method includes: obtaining, by a communications device, a first packet, where the first packet includes a plurality of extension packet headers; and obtaining an extension header self-describing option from the first packet, where the extension header self-describing option is used to indicate information about the plurality of extension packet headers. Therefore, the communications device obtains, based on the extension header self-describing option in the first packet, a first extension packet header included in the plurality of extension packet headers. Packet header information of the extension packet header in the first packet can be obtained by using the extension header self-describing option, and the first extension packet header that needs to be parsed can be directly located from the first packet by using the obtained packet header information.

20 Claims, 8 Drawing Sheets

(56) References Cited

U.S. PATENT DOCUMENTS

| | | | |
|---|---|---|---|
| 11,190,445 B2* | 11/2021 | Bosch | H04L 45/741 |
| 11,533,263 B2* | 12/2022 | Li | H04L 45/566 |
| 2016/0366160 A1* | 12/2016 | Kapoor | H04L 41/0866 |
| 2018/0241671 A1* | 8/2018 | Bosch | H04L 69/22 |
| 2018/0262388 A1* | 9/2018 | Johnson | H04L 63/0823 |
| 2019/0149544 A1* | 5/2019 | Larson | H04L 63/10 |
| | | | 713/154 |
| 2019/0166108 A1* | 5/2019 | Larson | H04L 63/0485 |
| 2019/0182366 A1 | 6/2019 | Kfir et al. | |
| 2019/0356590 A1* | 11/2019 | Bosch | H04L 69/22 |

* cited by examiner

PACKET HEADER INFORMATION OBTAINING METHOD, PACKET GENERATION METHOD, DEVICE, AND STORAGE MEDIUM

CROSS-REFERENCE TO RELATED APPLICATIONS

This application is a continuation of International Application No. PCT/CN2021/120790, filed on Sep. 26, 2021, which claims priority to Chinese Patent Application No. 202011066254.5, filed on Sep. 30, 2020. The disclosures of the aforementioned applications are hereby incorporated by reference in their entireties.

TECHNICAL FIELD

The embodiments relate to the field of communications technologies, a packet header information obtaining method, a packet generation method, a device, and a storage medium.

BACKGROUND

In a communications network, a packet transmitted between communications devices often includes one or more extension packet headers. How to obtain packet header information is a key in packet transmission and packet processing.

SUMMARY

The embodiments may provide a packet header information obtaining method, a packet generation method, a device, and a storage medium, to resolve a related problem.

According to a first aspect, a packet header information obtaining method is provided. An example in which a communications device performs the method is used. The communications device obtains a first packet, where the first packet includes a plurality of extension packet headers. Then, the communications device obtains an extension header self-describing option from the first packet, where the extension header self-describing option is used to indicate information about the plurality of extension packet headers. Afterwards, the communications device obtains, based on the extension header self-describing option in the first packet, a first extension packet header included in the plurality of extension packet headers. The first extension packet header is any extension packet header in the plurality of extension packet headers included in the first packet.

Packet header information of the extension packet headers in the first packet can be obtained by parsing the extension header self-describing option, without traversing all extension packet headers in the first packet, and an extension packet header that needs to be parsed can be directly located from the first packet by using the obtained packet header information. Therefore, not only efficiency of obtaining the packet header information is relatively high, but also hardware processing overheads are reduced. This avoids occurrence of a case in which the packet header information cannot be obtained due to a limitation of a hardware capability and is applicable to a service case in which a plurality of extension packet headers coexist in the first packet.

In a possible implementation, the extension header self-describing option is located in a standard packet header included in the first packet. Because the standard packet header is located before the extension packet header, a speed of obtaining the packet header information can be further improved by setting the extension header self-describing option in the standard packet header.

In a possible implementation, the extension header self-describing option is located in a flow label field of the standard packet header.

In a possible implementation, the extension header self-describing option is located in any extension packet header in the plurality of extension packet headers.

In a possible implementation, the extension header self-describing option is located in the $1^{st}$ extension packet header in the plurality of extension packet headers. The extension header self-describing option is set in the $1^{st}$ extension packet header in the plurality of extension packet headers, so that parsing of another extension packet header can be avoided, and further packet header information can be quickly obtained.

In a possible implementation, the first packet further includes a first option type and a first option length. The first option type is used to indicate that the first packet includes the extension header self-describing option, and the first option length is used to indicate a length of the extension header self-describing option.

In a possible implementation, the first packet further includes a second option type. The second option type is used to indicate that the first packet includes the extension header self-describing option, and the second option type is further used to indicate the length of the extension header self-describing option.

In a possible implementation, the first packet further includes an option bitmap. The option bitmap includes an indication bit, and the indication bit is used to indicate that the first packet includes the extension header self-describing option.

In a possible implementation, the extension header self-describing option includes a plurality of packet header information subfields, and the packet header information subfield includes type indication information of a corresponding extension packet header and location indication information of the corresponding extension packet header.

In a possible implementation, the extension header self-describing option includes a template subfield and a location indication subfield. The template subfield is used to indicate an arrangement sequence of the plurality of extension packet headers. The location indication subfield includes location indication information of the plurality of extension packet headers arranged in the arrangement sequence.

In a possible implementation, the template subfield further includes type indication information of the plurality of extension packet headers.

In a possible implementation, the location indication information includes a length occupied by the corresponding extension packet header, a location of the corresponding extension packet header in the first packet, a location offset of the corresponding extension packet header to a previous packet header, or a location offset of the corresponding extension packet header to the standard packet header included in the first packet.

In a possible implementation, the obtaining, based on the extension header self-describing option, information about the first extension packet header included in the plurality of extension packet headers includes: determining a packet header type of a to-be-found first extension packet header; determining type indication information corresponding to the packet header type of the first extension packet header; obtaining information about the first extension packet header based on the type indication information of the first extension packet header and the extension header self-describing option; and obtaining the first extension packet header from the first packet based on the information about the first extension packet header.

In a possible implementation, the obtaining the first extension packet header from the first packet based on the information about the first extension packet header includes: determining, based on the information about the first extension packet header, location indication information that corresponds to the first extension packet header and that corresponds to the type indication information of the first extension packet header; and obtaining the first extension packet header from the first packet based on the location indication information corresponding to the first extension packet header.

In a possible implementation, the first packet is an IPv6 packet.

According to a second aspect, a packet generation method is provided. The method includes:
  obtaining packet data, and determining a plurality of extension packet headers corresponding to the packet data;
  obtaining information about the plurality of extension packet headers, and obtaining an extension header self-describing option based on the information about the plurality of extension packet headers, where the extension header self-describing option is used to indicate the information about the plurality of extension packet headers; and
  generating a first packet based on the packet data, the plurality of extension packet headers, and the extension header self-describing option, where the first packet includes the extension header self-describing option and the plurality of extension packet headers.

The extension header self-describing option carries the information about the plurality of extension packet headers, and the extension header self-describing option is encapsulated into the first packet, so that a communications device that receives the first packet can directly obtain packet header information of the extension packet headers in the first packet based on the extension header self-describing option. Because there is no need to traverse all extension packet headers in the first packet, and the extension packet header that needs to be parsed can be directly located from the first packet by using the obtained packet header information, not only efficiency of obtaining the packet header information is relatively high, but also hardware processing overheads are reduced. This avoids occurrence of a case in which the packet header information cannot be obtained due to a limitation of a hardware capability and is applicable to a service case in which a plurality of extension packet headers may coexist in the first packet.

According to a third aspect, a packet header information obtaining apparatus is provided. The apparatus includes:
  a first obtaining module, configured to obtain a first packet, where the first packet includes a plurality of extension packet headers;
  a second obtaining module, configured to obtain an extension header self-describing option from the first packet, where the extension header self-describing option is used to indicate information about the plurality of extension packet headers; and
  a third obtaining module, configured to obtain, based on the extension header self-describing option, a first extension packet header included in the plurality of extension packet headers.

In a possible implementation, the extension header self-describing option is located in a standard packet header included in the first packet.

In a possible implementation, the extension header self-describing option is located in a flow label field of the standard packet header.

In a possible implementation, the extension header self-describing option is located in any extension packet header in the plurality of extension packet headers.

In a possible implementation, the extension header self-describing option is located in the $1^{st}$ extension packet header in the plurality of extension packet headers.

In a possible implementation, the first packet further includes a first option type and a first option length. The first option type is used to indicate that the first packet includes the extension header self-describing option, and the first option length is used to indicate a length of the extension header self-describing option.

In a possible implementation, the first packet further includes a second option type. The second option type is used to indicate that the first packet includes the extension header self-describing option, and the second option type is further used to indicate the length of the extension header self-describing option.

In a possible implementation, the first packet further includes an option bitmap. The option bitmap includes an indication bit, and the indication bit is used to indicate that the first packet includes the extension header self-describing option.

In a possible implementation, the extension header self-describing option includes a plurality of packet header information subfields, and the packet header information subfield includes type indication information of a corresponding extension packet header and location indication information of the corresponding extension packet header.

In a possible implementation, the extension header self-describing option includes a template subfield and a location indication subfield. The template subfield is used to indicate an arrangement sequence of the plurality of extension packet headers. The location indication subfield includes location indication information of the plurality of extension packet headers arranged in the arrangement sequence.

In a possible implementation, the template subfield further includes type indication information of the plurality of extension packet headers.

In a possible implementation, the location indication information includes a length occupied by the corresponding extension packet header, a location of the corresponding extension packet header in the first packet, a location offset of the corresponding extension packet header to a previous packet header, or a location offset of the corresponding extension packet header to the standard packet header included in the first packet.

In a possible implementation, the third obtaining module is configured to: determine a packet header type of a to-be-found first extension packet header; determine type indication information corresponding to the packet header type of the first extension packet header; obtain the first extension packet header based on the type indication information of the first extension packet header and the extension header self-describing option; and obtain the first extension packet header from the first packet based on the information about the first extension packet header.

In a possible implementation, the third obtaining module is configured to: determine, based on the information about the first extension packet header, location indication information that corresponds to the first extension packet header and that corresponds to the type indication information of the first extension packet header; and obtain the first extension packet header from the first packet based on the location indication information corresponding to the first extension packet header.

In a possible implementation, the first packet is an IPv6 packet.

According to a fourth aspect, a packet generation apparatus is provided. The apparatus includes:
- an obtaining module, configured to obtain packet data;
- a determining module, configured to determine a plurality of extension packet headers corresponding to the packet data;
- the obtaining module is further configured to: obtain information about the plurality of extension packet headers, and obtain an extension header self-describing option based on the information about the plurality of extension packet headers, where the extension header self-describing option is used to indicate the information about the plurality of extension packet headers; and
- a generation module, configured to generate a first packet based on the packet data, the plurality of extension packet headers, and the extension header self-describing option, where the first packet includes the extension header self-describing option and the plurality of extension packet headers.

According to a fifth aspect, a communications device is provided. The device includes a communications interface and a processor. Optionally, the communications device further includes a memory. The communications interface, the memory, and the processor communicate with each other through an internal connection path. The memory is configured to store instructions. The processor is configured to execute the instructions stored in the memory, to control the communications interface to receive a signal and control the communications interface to send a signal. In addition, when the processor executes the instructions stored in the memory, the processor is enabled to perform the method in any one of the first aspect or the possible implementations of the first aspect.

According to a sixth aspect, a communications device is provided. The device includes a communications interface and a processor. Optionally, the communications device further includes a memory. The communications interface, the memory, and the processor communicate with each other through an internal connection path. The memory is configured to store instructions. The processor is configured to execute the instructions stored in the memory, to control the communications interface to receive a signal and control the communications interface to send a signal. In addition, when the processor executes the instructions stored in the memory, the processor is enabled to perform the method in any one of the second aspect or the possible implementations of the second aspect.

Optionally, there are one or more processors, and there are one or more memories.

Optionally, the memory may be integrated with the processor, or the memory and the processor are separately disposed.

In an implementation process, the memory may be a non-transitory memory, for example, a read-only memory (ROM). The memory and the processor may be integrated on a same chip or may be separately disposed on different chips. A type of the memory and a manner of disposing the memory and the processor are not limited in embodiments.

According to a seventh aspect, a communications device is provided. The communications device includes a processor and a communications interface. The processor executes instructions, so that the communications device is enabled to perform the packet header information obtaining method according to any one of the first aspect or the implementations of the first aspect or implement the packet generation method according to any one of the second aspect or the implementations of the second aspect.

According to an eighth aspect, a communications system is provided. The system includes a first communications device and a second communications device. The first communications device is configured to perform the packet header information obtaining method according to any one of the first aspect or the implementations of the first aspect. The second communications device is configured to perform the packet generation method according to any one of the second aspect or the implementations of the second aspect.

According to a ninth aspect, a computer program product is provided. The computer program product includes computer program code. When the computer program code is run by a computer, the computer is enabled to perform the methods in the foregoing aspects.

According to a tenth aspect, a non-transitory computer-readable storage medium is provided. The non-transitory computer-readable storage medium stores a program or instructions. When the program or the instructions runs/run on a computer, the methods in the foregoing aspects are performed.

According to an eleventh aspect, a chip is provided, and includes a processor, configured to invoke and run instructions stored in a memory, so that a communications device in which the chip is installed performs the methods in the foregoing aspects.

According to a twelfth aspect, another chip is provided, and includes an input interface, an output interface, a processor, and a memory. The input interface, the output interface, the processor, and the memory are connected through an internal connection path. The processor is configured to execute code in the memory. When the code is executed, the processor is configured to perform the methods in the foregoing aspects.

DETAILED DESCRIPTION OF THE EMBODIMENTS

Terms used in the implementations are merely used to explain the embodiments, but are not intended as limiting.

Figures 1, 2:
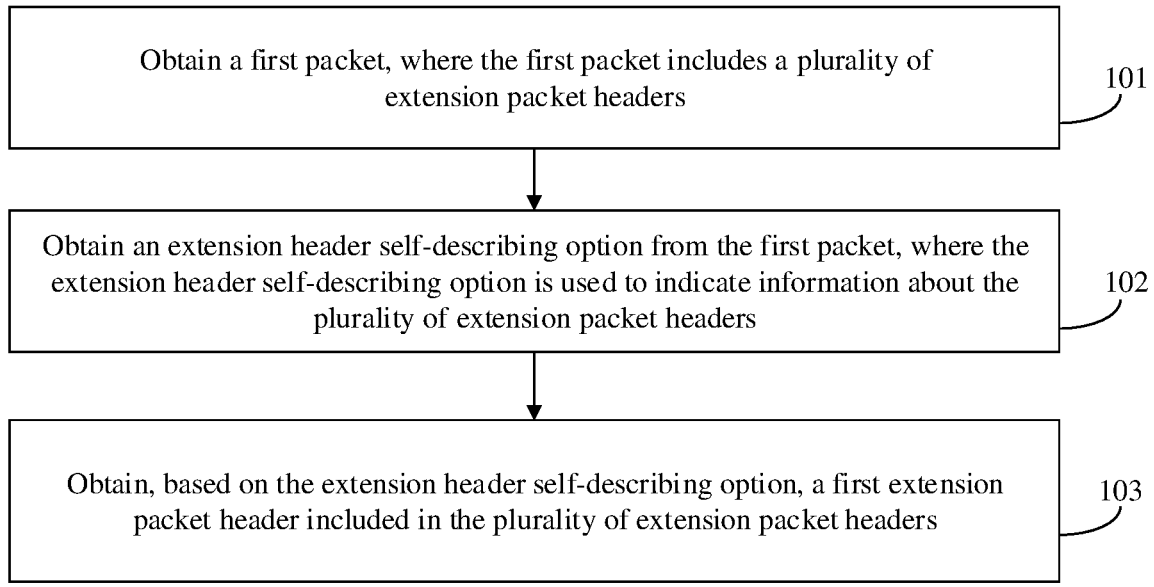
FIG. 1 is a flowchart of a packet header information obtaining method according to an embodiment.
FIG. 2 is a schematic diagram of a format of a standard packet header and an extension packet header according to an embodiment.

In a communications network, a packet transmitted between communications devices often includes one or more extension packet headers. The extension packet headers all carry packet header information. If the extension packet headers are sequentially parsed to obtain the packet header information, efficiency is relatively low. For a case in which the packet includes the plurality of extension packet headers, an efficiency problem may be obvious. Therefore, how to quickly obtain the packet header information is a key in packet transmission and packet processing. In view of this, an embodiment may provide a packet header information obtaining method. The method may be performed by a communications device. The communications device includes, but is not limited to, any device, such as a server, a switch, or a router, that has a packet sending requirement. As shown in FIG. 1, the method includes the following steps 101 to 103.

101. Obtain a first packet, where the first packet includes a plurality of extension packet headers (extension header).

The first packet is any packet that supports an extension packet header, and a type of the first packet is not limited in this embodiment. In addition to supporting the extension packet header, the first packet often further supports a standard packet header. Each extension packet header is used to provide an optional extension function based on the standard packet header. For example, the first packet is an internet protocol version 6 (IPv6) packet. In this case, the standard packet header is also referred to as an IPv6 packet header or a basic packet header.

FIG. 2 shows a format of a standard packet header and a plurality of extension packet headers in an IPv6 packet. Optionally, the standard packet header includes a next packet header (next header) field, and the next packet header field of the standard packet header is used to indicate a packet header type of the $1^{st}$ extension packet header. Formats of different extension packet headers are different, but each extension packet header includes a next header field. A next packet header field included in one extension packet header is used to indicate a packet header type of a next extension packet header of the extension packet header. It should be noted that the format shown in FIG. 2 is a format specified in request for comment (RFC) 8200 and is not intended to limit.

For example, when the first packet is an IPv6 packet, the plurality of extension packet headers that are located after the standard packet header in the first packet include an extension packet header defined in RFC8200, and the plurality of extension packet headers are sequentially located after the standard packet header in an appearance sequence recommended by RFC8200. For the appearance sequence recommended by RFC8200, refer to Table 1.

TABLE 1

| Appearance sequence | Packet header name | Value |
|---|---|---|
| 1 | Standard packet header | 41 |
| 2 | Hop-by-hop options packet header (HBH) | 0 |
| 3 | Destination options packet header (DOH) | 60 |
| 4 | Routing packet header (routing header) | 43 |
| 5 | Fragment packet header (FH) | 44 |
| 6 | Authentication packet header (AH) | 51 |
| 7 | Encapsulating security payload packet header (ESP) | 50 |
| 8 | Destination options packet header | 60 |
| 9 | Upper-layer packet header (upper-layer header) | |

A value corresponding to an extension packet header is used to indicate a packet header type of the extension packet header. For example, based on a value of 60 that corresponds to one extension packet header, the extension packet header can be determined as DOH. Therefore, a value of a next packet header field of one extension packet header is a value corresponding to the next extension packet header of the extension packet header, so that the next packet header field of the extension packet header can be used to indicate a packet header type of the next extension packet header of the extension packet header.

In Table 1, the upper-layer packet header is used to indicate a transmission protocol supported by the first packet. The upper-layer packet header has a plurality of cases, and values corresponding to different cases are different. For example, when the upper-layer packet header is a transmission control protocol (TCP) packet header, a corresponding value is 6, to indicate that the first packet supports the TCP. For another example, when the upper-layer packet header is a user datagram protocol (UDP) packet header, a corresponding value is 17, to indicate that the first packet supports the UDP. Values corresponding to other transmission protocol packet headers are not enumerated herein. In addition, a value of a next packet header field of the last extension packet header in the plurality of extension packet headers is 59, indicating that no other extension packet header exists after the last extension packet header.

According to the foregoing description, an example in which the first packet sequentially includes the standard packet header, the RH, and the TCP packet header is used. In this case, a value of a next packet header field of the standard packet header is 43, indicating that the $1^{st}$ extension packet header is the RH. A value of a next packet header field of the RH is 6, indicating that the $2^{nd}$ extension packet header is the TCP packet header. A value of a next packet header field of the TCP packet header is 59, indicating that no other extension packet header exists after the TCP packet header.

The extension packet header in the first packet may not be limited in this embodiment. For example, in addition to the extension packet headers shown in Table 1, the extension packet header further includes an extension packet header that is customized based on an actual requirement. In this case, the customized extension packet header may further have a next packet header field, and the customized extension packet header has a corresponding value. The value corresponding to the customized extension packet header may be another value other than a value corresponding to each defined extension packet header. Functions of the next packet header field and the value of the customized extension packet header are the same as those in the foregoing description, and details are not described herein again.

102. Obtain an extension header self-describing option from the first packet, where the extension header self-describing option is used to indicate information about the plurality of extension packet headers.

The extension header self-describing option can be obtained by parsing the first packet. For example, the extension header self-describing option is located in the standard packet header included in the first packet or is located in any extension packet header of the first packet. In this embodiment, in a process of parsing the first packet, the standard packet header and the extension packet headers are sequentially parsed starting from the standard packet header, until the extension header self-describing information is obtained from one packet header of the first packet. It can be understood that, when the extension header self-describing option is located in an extension packet header, a smaller offset of the extension packet header in which the extension header self-describing option is located to the standard packet header indicates a smaller quantity of extension packet headers that need to be parsed. Therefore, in an example embodiment, the extension header self-describing option is located in the $1^{st}$ extension packet header in the plurality of extension packet headers.

When the first packet is an IPv6 packet, RFC8200 stipulates that when the plurality of extension packet headers include the HBH, the HBH needs to be used as the $1^{st}$ extension packet header after the standard packet header. Therefore, based on a case in which the plurality of extension packet headers may include the HBH, the $1^{st}$ extension packet header in which the extension header self-describing option is located is the HBH. Based on a case in which the plurality of extension packet headers may not include the HBH, the $1^{st}$ extension packet header in which the extension header self-describing option is located may be any extension packet header other than the HBH.

In addition, in addition to setting the extension header self-describing option in the $1^{st}$ extension packet header, any other extension packet header is further supported to carry the extension header self-describing option in this embodiment. According to the method in this embodiment, the extension packet headers do not need to be parsed in sequence. To quickly obtain the extension header self-describing option, a location of the extension header self-describing option may be agreed on in advance. For example, the extension header self-describing option is set in the last extension packet header by default. In this case, the last extension packet header may be directly parsed when packet header information is to be obtained. For another example, the extension header self-describing option is set in the $2^{nd}$ extension packet header by default. In this case, the $2^{nd}$ extension packet header may be directly parsed when packet header information is to be obtained.

Further, the standard packet header and the extension packet headers include different fields. When a packet header in which the extension header self-describing option is located varies, a field in which the extension header self-describing option is located in the packet header also varies. For fields in which the extension header self-describing option is located in various cases, refer to Table 2 below.

TABLE 2

Figure 3:
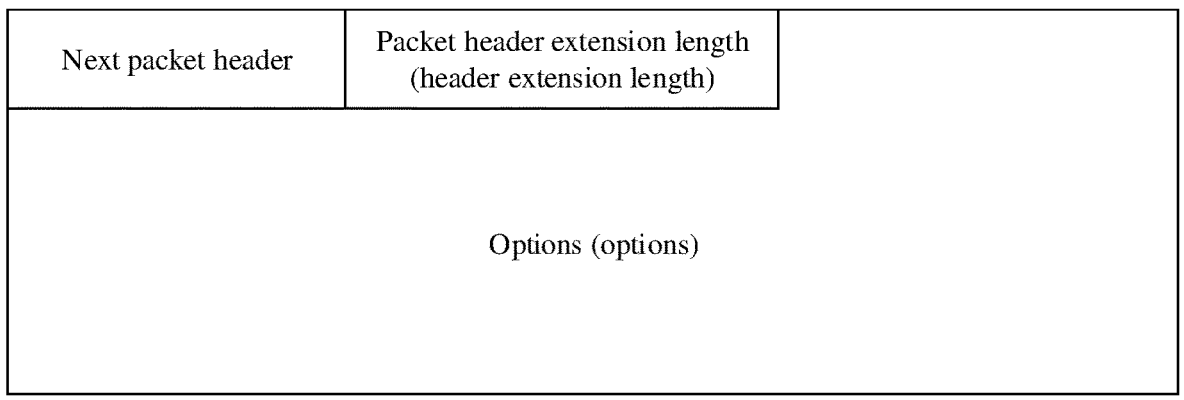
FIG. 3 is a schematic diagram of a format of an extension packet header according to an embodiment.
Figure 4:
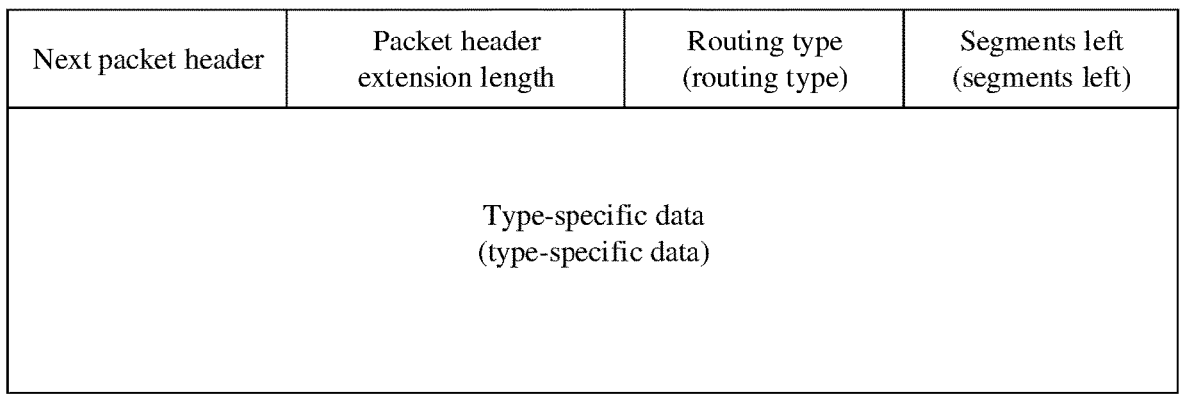
FIG. 4 is a schematic diagram of a format of an extension packet header according to an embodiment.

| Schematic diagram of a format of a packet header | Packet header name | Field in which an extension header self-describing option is located |
| --- | --- | --- |
| FIG. 2 | Standard packet header | Flow label field |
| FIG. 3 | HBH | Options field |
| FIG. 3 | DOH | Options field |
| FIG. 4 | RH | Type-specific data field |

Figure 5:
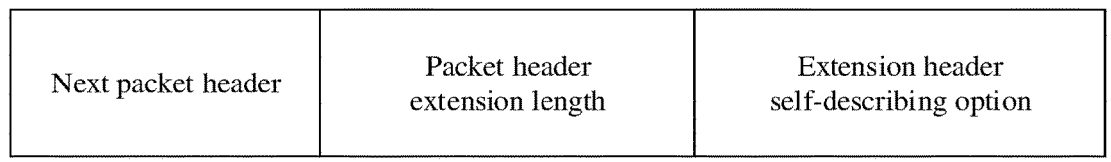
FIG. 5 is a schematic diagram of a format of an extension packet header including an extension header self-describing option according to an embodiment.

FIG. 3 and FIG. 4 each are a schematic diagram of a format of an extension packet header according to an embodiment. The format of the extension packet header shown in FIG. 3 may be used as a format of the HBH and the DOH. The format of the extension packet header shown in FIG. 3 includes a next packet header field, a packet header extension length field, and an options field. The options field may include one or more options. For example, the extension header self-describing option is located in the $1^{st}$ option included in the options field. The HBH is used as an example. For a schematic diagram of the extension header self-describing option located in the $1^{st}$ option of the HBH options field, refer to FIG. 5. It can be understood that, because the extension header self-describing option shown in FIG. 5 is located in the $1^{st}$ option of the options field, there may be one or more other options (not shown in FIG. 5) with other functions after the extension header self-describing option. The format of the extension packet header shown in FIG. 4 may be used as a format of the RH. In FIG. 4, a next packet header field, a packet header extension length field, a routing type field, a segments left field, and a type-specific data field are included. For example, the extension header self-describing option may be located in the type-specific data field shown in FIG. 4.

It can be understood that, in the foregoing cases, the field in which the extension header self-describing option is located is merely an example. Regardless of which packet header the extension header self-describing option is located in, a field in which the extension header self-describing option is located in the packet header is not limited in this embodiment. During actual application, in addition to the field exemplified above, the extension header self-describing option can be alternatively located in another field based on an actual requirement.

For example, the extension header self-describing option is used to indicate information about the plurality of extension packet headers. The extension header self-describing option includes information about all the extension packet headers. That the first packet includes three extension packet headers is used as an example. Regardless of whether the extension header self-describing option is located in the standard packet header or the extension packet header, the extension header self-describing option includes information about the three extension packet headers.

Alternatively, the extension header self-describing option includes only a packet header in which the extension header self-describing option is located and information about each extension packet header after the packet header in which the extension header self-describing option is located. That the first packet includes three extension packet headers is used as an example. In this case, based on a case in which the extension header self-describing option is located in the $1^{st}$ extension packet header, the extension header self-describing option includes information about the $1^{st}$ extension packet header, the $2^{nd}$ extension packet header, and the $3^{rd}$ extension packet header. Based on a case in which the extension header self-describing option is located in the $2^{nd}$ extension packet header, the extension header self-describing option includes information about the $2^{nd}$ extension packet header and the $3^{rd}$ extension packet header.

Alternatively, the extension header self-describing option includes information about each extension packet header after a packet header in which the extension header self-describing option is located. That the first packet includes three extension packet headers is still used as an example. In this case, based on a case in which the extension header self-describing option is located in the $1^{st}$ extension packet header, the extension header self-describing option includes information about the $2^{nd}$ extension packet header and the $3^{rd}$ extension packet header.

It should be noted that, in this embodiment, because in the process of parsing the first packet, the standard packet header and the extension packet headers are sequentially parsed starting from the standard packet header, before the extension header self-describing option is obtained through parsing, the other packet headers before the packet header in which the extension header self-describing option is located are parsed, to obtain information about the other packet headers. Therefore, in the foregoing two cases, the extension header self-describing option may not include information about each packet header before the packet header in which the extension header self-describing option is located.

Alternatively, in this embodiment, the first packet may further include two or more extension header self-describing options, and the two or more extension header self-describing options are respectively located in different packet headers of the first packet. For example, information included in any extension header self-describing option is information about each extension packet header from a packet header in which the extension header self-describing option is located to a packet header in which a next extension header self-describing option is located. It can be understood that, the foregoing case is for another extension header self-describing option other than the last extension header self-describing option in the first packet. The information included in the last extension header self-describing option in the first packet is information about packet headers from a packet header in which the last extension header self-describing option is located to the last extension packet header.

For example, the first packet includes five extension packet headers, and two extension header self-describing options are respectively located in the $1^{st}$ extension packet header and the $4^{th}$ extension packet header. In this case, the extension header self-describing option located in the $1^{st}$ extension packet header includes information about the $1^{st}$ extension packet header, the $2^{nd}$ extension packet header, and the $3^{rd}$ extension packet header. The extension header self-describing option located in the $4^{th}$ extension packet header includes information about the $4^{th}$ extension packet header and the $5^{th}$ extension packet header.

Further, regardless of the above-described manner in which the extension header self-describing option carries the information about the extension packet header, for any extension packet header, the extension header self-describing option includes type indication information and location indication information of the extension packet header. The type indication information is used to indicate a packet header type of the extension packet header, and the location indication information is used to indicate a location of the extension packet header in the first packet. For example, the extension header self-describing option carries type indication information and location indication information of the plurality of extension packet headers in the following two manners.

Carrying manner 1: The extension header self-describing option includes a plurality of packet header information subfields, and the packet header information subfield includes type indication information of a corresponding extension packet header and location indication information of the corresponding extension packet header.

The packet header information subfields are in a one-to-one correspondence with the extension packet headers. For example, an arrangement sequence of the packet header information subfields in the extension header self-describing option is the same as an arrangement sequence of the extension packet headers in the first packet. For example, the $1^{st}$ packet header information subfield in the extension header self-describing option corresponds to the $1^{st}$ extension packet header in the first packet. For example, for any packet header information subfield, the packet header information subfield includes type indication information of a corresponding extension packet header and location indication information of the corresponding extension packet header.

The type indication information of the corresponding extension packet header is a next packet header field in the extension packet header corresponding to the packet header information subfield. The type indication of the corresponding extension packet header indicates a packet header type of a next extension packet header of the extension packet header corresponding to the packet header information subfield.

The location indication information of the corresponding extension packet header includes, but is not limited to: a length occupied by the extension packet header corresponding to the packet header information subfield, a location of the corresponding extension packet header in the first packet, a location offset of the corresponding extension packet header to a previous extension packet header, and a location offset of the corresponding extension packet header to the standard packet header included in the first packet. The length occupied by the corresponding extension packet header includes, but is not limited to, a quantity of bits (bit) or bytes occupied by the corresponding extension packet header. The location of the corresponding extension packet header in the first packet refers to a location offset of the corresponding extension packet header to the first bit of the first packet, that is, the first bit of the standard packet header. The location offset of the corresponding extension packet header to the standard packet header included in the first packet is a location offset of the corresponding extension packet header to the last bit of the standard packet header.

For example, location indication information that is of corresponding extension packet headers and that is in different packet header information subfields may be the same or different. For example, when the location indication information that is of the corresponding extension packet headers and that is in the different packet header information subfields is different, location indication information that is of a corresponding extension packet header and that is in the $1^{st}$ packet header information subfield is a length occupied by the extension packet header corresponding to the $1^{st}$ packet header information subfield, and location indication information that is of a corresponding extension packet header and that is in the $2^{nd}$ packet header information subfield is a location of the extension packet header corresponding to the $2^{nd}$ packet header information subfield in the first packet.

Figure 6:
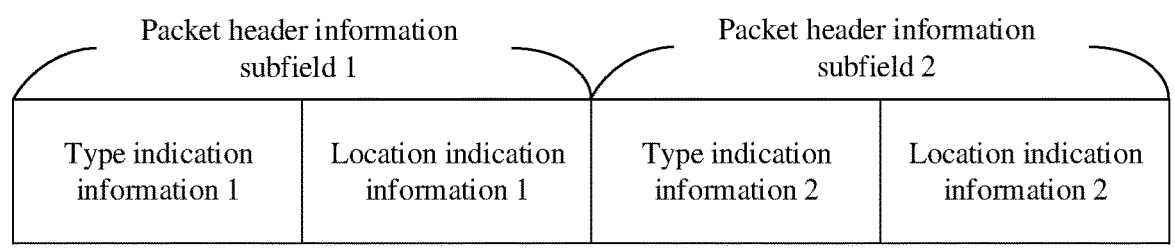
FIG. 6 is a schematic diagram of a structure of an extension header self-describing option according to an embodiment.

FIG. 6 shows an example extension header self-describing option for carrying indication information based on the carrying manner 1. The extension header self-describing option includes N (N≥2) packet header information subfields. The $1^{st}$ packet header information subfield includes type indication information of the $1^{st}$ extension packet header and location indication information of the $1^{st}$ extension packet header.

Figure 7:
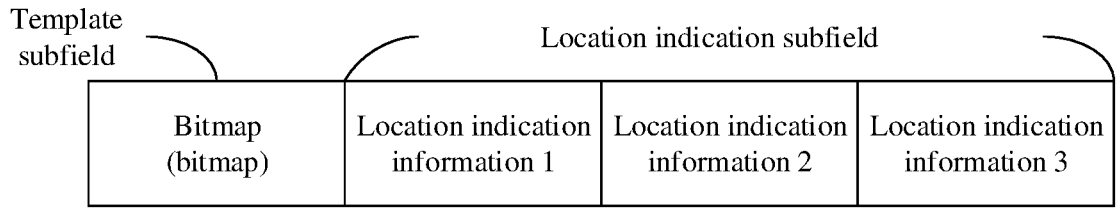
FIG. 7 is a schematic diagram of a structure of an extension header self-describing option according to an embodiment.

Carrying manner 2: FIG. 7 is a diagram of an example structure of an extension header self-describing option. The extension header self-describing option includes a template (template) subfield and a location indication subfield. The template subfield is used to indicate an arrangement sequence of the plurality of extension packet headers. The location indication subfield includes location indication information of the plurality of extension packet headers arranged in the arrangement sequence.

For example, the template subfield is in a bitmap form, and the template subfield includes at least one bit. One bit corresponds to one extension packet header, and a value of the bit is used to indicate whether the extension packet header corresponding to the bit exists. The arrangement sequence indicated by the template subfield is determined based on a sequence of bits. For example, in the template subfield, the $1^{st}$ bit is used to indicate whether the HBH exists, the $2^{nd}$ bit is used to indicate whether the DOH exists, and the $3^{rd}$ bit is used to indicate whether the RH exists. In this case, the arrangement sequence indicated by the template subfield is the HBH, the DOH, and the RH.

For example, a value 1 of a bit is used to indicate that an extension packet header corresponding to the bit exists, and a value 0 of a bit is used to indicate that an extension packet header corresponding to the bit does not exist. For example, the $1^{st}$ bit, the $2^{nd}$ bit, and the $3^{rd}$ bit in an 8-bit template subfield are respectively used to indicate whether the HBH, the DOH, and the RH exist. In this case, a value 11000000 of the template subfield is used to indicate that the first packet includes the HBH and the DOH, and a value 00100000 of the template subfield is used to indicate that the first packet includes the RH. It can be understood with reference to the appearance sequence defined in RFC8200 that the RH is the $1^{st}$ extension packet header located after the standard packet header in the first packet. Other cases are not enumerated herein.

For the location indication information that is of the plurality of extension packet headers and that is included in the location indication subfield, refer to the description in the carrying manner 1. Details are not described herein again. The location indication information of the plurality of extension packet headers is arranged in the arrangement sequence indicated by the template subfield. For example, if the arrangement sequence indicated by the template subfield is the HBH, the DOH, and the RH, the $1^{st}$ piece of location indication information included in the location indication subfield is location indication information of the HBH, the $2^{nd}$ piece of location indication information included in the location indication subfield is location indication information of the DOH, and the $3^{rd}$ piece of location indication information included in the location indication subfield is location indication information of the RH.

For example, the template subfield further includes the type indication information of the plurality of extension packet headers, and the type indication information of the plurality of extension packet headers is also arranged in the arrangement sequence indicated by the template subfield. For the type indication information of the extension packet header, refer to the description in the carrying manner 1. Details are not described herein again.

For example, the extension header self-describing option can further include indication information of the standard packet header in addition to the information about the extension packet header. The indication information of the standard packet header includes, but is not limited to, at least one of a value of the next packet header field in the standard packet header and location indication information of the standard packet header. The location indication information of the standard packet header includes, but is not limited to, a length occupied by the standard packet header and a location of the standard packet header in the first packet.

For the extension header self-describing option in the foregoing description, in this embodiment, that the first packet includes the extension header self-describing option can be indicated in the following three manners, which are separately described below.

Indication manner 1: The first packet further includes a first option type and a first option length in addition to the extension header self-describing option. The first option type is used to indicate that the first packet includes the extension header self-describing option, and the first option length is used to indicate a length of the extension header self-describing option.

Figure 8:
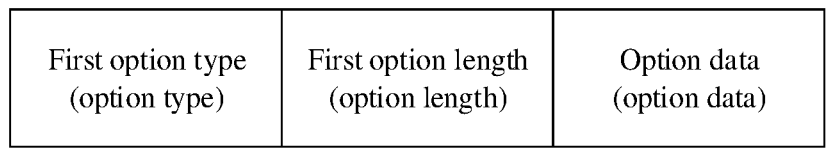
FIG. 8 is a diagram of a structure of a first option type, a first option length, and an extension header self-describing option according to an embodiment.

In the indication manner 1, the extension header self-describing option is located in a type-length-value (TLV), where T is used to represent the first option type, L is used to represent the first option length, and V is used to represent the extension header self-describing option. For a structural relationship between the first option type, the first option length, and the extension header self-describing option, refer to FIG. 8. Option data shown in FIG. 8 is the extension header self-describing option. For example, the first option type occupies eight bits, and the first option length occupies eight bits. Based on a case in which the first option type is obtained in the parsing process of the first packet, it can be determined, according to the indication of the first option type, that the first packet includes the extension header self-describing option. Afterwards, in this embodiment, the first option length may continue to be parsed to obtain the length of the extension header self-describing option, and then the extension header self-describing option is parsed based on the length of the extension header self-describing option. In this way, the extension header self-describing option is obtained. Alternatively, the length of the extension header self-describing option can be described by the semantics of the extension header self-describing option. Therefore, in this embodiment, the first option length may not be parsed, and the extension header self-describing option may be directly parsed based on the length described by the semantics of the extension header self-describing option.

It should be noted that, based on a case in which parsing fails at the first option type in the parsing process, it indicates that a communications device used for the parsing is a device that cannot identify the extension header self-describing option. In this case, the communications device used for the parsing may continue parsing the first option length, and continue to parse, according to an indication of the first option length, another packet header or packet data that is in the first packet and that is after the packet header in which the extension header self-describing option is located.

Indication manner 2: The first packet further includes a second option type in addition to the extension header self-describing option. The second option type is used to indicate that the first packet includes the extension header self-describing option, and the second option type is further used to indicate a length of the extension header self-describing option.

Figure 9:
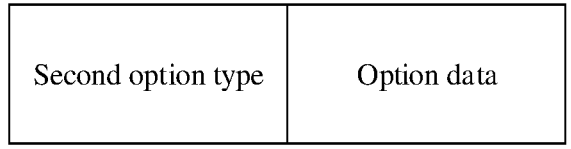
FIG. 9 is a diagram of a structure of a second option type and an extension header self-describing option according to an embodiment.

For a structural relationship between the second option type and the extension header self-describing option, refer to FIG. 9. Option data shown in FIG. 9 is the extension header self-describing option. Based on a case in which the second option type is obtained in the parsing process, it can be determined, according to the indication of the second option type, that the first packet includes the extension header self-describing option. In addition, the length of the extension header self-describing option can be further obtained according to the indication of the second option type. For a manner of parsing the extension header self-describing option based on the length of the extension header self-describing option, refer to the description in the indication manner 1. Details are not described herein again. For example, the second option type occupies eight bits.

Indication manner 3: The first packet further includes an option bitmap in addition to the extension header self-describing option, the option bitmap includes an indication bit, and the indication bit is used to indicate that the first packet includes the extension header self-describing option.

Figure 10:
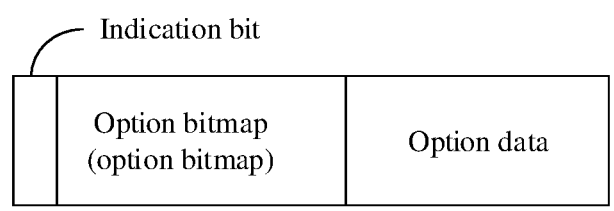
FIG. 10 is a diagram of a structure of an option bitmap, an indication bit, and an extension header self-describing option according to an embodiment.

For a structural relationship between the option bitmap, the indication bit, and the extension header self-describing information, refer to FIG. 10. Option data shown in FIG. 10 is the extension header self-describing option. For example, the option bitmap occupies 16 bits, the indication bit occupies one bit, and the indication bit may be any bit in bits occupied by the option bitmap. For example, in the case shown in FIG. 10, the first bit of the option bitmap is used as the indication bit. In this embodiment, a value of the indication bit is used to indicate whether the first packet includes the extension header self-describing option. For example, a value 1 of the indication bit indicates that the first packet includes the extension header self-describing option, or a value 0 of the indication bit indicates that the first packet does not include the extension header self-describing option.

For example, the length of the extension header self-describing option may be alternatively stored in advance in this embodiment. When the value of the indication bit indicates that the first packet includes the extension header self-describing option, the length of the extension header self-describing option is obtained, to obtain the extension header self-describing option through parsing based on the length of the extension header self-describing option.

103. Obtain, based on the extension header self-describing option, a first extension packet header included in the plurality of extension packet headers.

The extension header self-describing option is parsed, so that the information that is about the plurality of extension packet headers and that is included in the extension header self-describing option can be obtained. Therefore, the first extension packet header is obtained from the first packet based on the information about the plurality of extension packet headers. It can be understood that, in a process of obtaining the first extension packet header, there is no need to traverse all the extension packet headers in the first packet in the manner provided in this embodiment. As long as the extension header self-describing option is obtained from the first packet, packet header information of the extension packet headers in the first packet can be obtained from the extension header self-describing option, to obtain the first extension packet header. Because efficiency of obtaining the packet header information by using the extension header self-describing option is relatively high, efficiency of obtaining the first extension packet header from the first packet is also relatively high. In addition, in the process of parsing the first packet, hardware does not need to constantly slide a packet parsing window on a chip, so that hardware processing overheads are relatively small, and a requirement on a hardware capability is relatively low. A smaller location offset of the packet header in which the extension header self-describing option is located to the standard packet header may indicate higher efficiency of obtaining the packet header information, higher efficiency of obtaining the first extension packet header, and smaller hardware processing overheads.

For example, the obtaining, based on the extension header self-describing option, a first extension packet header included in the plurality of extension packet headers includes: determining a packet header type of a to-be-found first extension packet header; determining type indication information corresponding to the packet header type of the first extension packet header; obtaining information about the first extension packet header based on the type indication information of the first extension packet header and the extension header self-describing option; and obtaining the first extension packet header from the first packet based on the information about the first extension packet header.

Based on a case in which the extension header self-describing option includes the type indication information, it indicates that the first packet includes the first extension packet header, so that the first extension packet header can be further obtained from the first packet. Based on a case in which the extension header self-describing option does not include the type indication information, it indicates that the first packet does not include the first extension packet header, and the first extension packet header cannot be obtained from the first packet.

For example, the packet header type of the first extension packet header is HBH, and the type indication information corresponding to the packet header type of the first extension packet header is a value corresponding to HBH. It can be understood from Table 1 that the corresponding value is 0. Based on a case in which the value 0 exists in the extension header self-describing option of the first packet, it indicates that the first packet includes the HBH. That is, the first extension packet header is included. Correspondingly, based on a case in which the extension header self-describing option of the first packet does not include the value 0, it indicates that the first packet does not include the HBH.

When the first packet includes the first extension packet header, the information about the first extension packet header is obtained from the extension header self-describing option. The information about the first extension packet header refers to type indication information and location indication information of the first extension packet header that correspond to each other. After the information about the first extension packet header is obtained, the first extension packet header can be obtained from the first packet based on the information about the first extension packet header.

For example, obtaining the first extension packet header from the first packet based on the information about the first extension packet header includes: determining, based on the information about the first extension packet header, the location indication information that corresponds to the first extension packet header and that corresponds to the type indication information of the first extension packet header; and obtaining the first extension packet header from the first packet based on the location indication information corresponding to the first extension packet header.

According to the carrying manner 1 described in step 102, one packet header information subfield includes type indication information and location indication information. In this manner, the location indication information corresponding to the type indication information is location indication information that is located in a same packet header information subfield as the type indication information. According to the carrying manner 2 described in step 102, the arrangement sequence of the location indication information is the same as the arrangement sequence indicated by the template subfield, and the arrangement sequence of the type indication information is also the same as the arrangement sequence indicated by the template subfield. Therefore, in this manner, the location indication information corresponding to the type indication information is location indication information having a same sequence as the type indication information. It can be understood that regardless of which carrying manner is used, the location indication information that is of the first extension packet header and that corresponds to the type indication information of the first extension packet header can be obtained.

Based on a case in which the location indication information is a length occupied by the first extension packet header, a packet header length of the standard packet header and a sum of packet header lengths of all extension packet headers located before the first extension packet header may be calculated. Therefore, the first extension packet header can be located by offsetting the sum of the packet header lengths by using the first bit of the first packet as a start point. Alternatively, based on a case in which the location indication information is a location of the first extension packet header in the first packet, the first extension packet header is directly located based on the location. Alternatively, based on a case in which the location indication information includes a location offset of the first extension packet header to a previous packet header, the first extension packet header can be located by offsetting the location offset based on the previous packet header. Alternatively, based on a case in which the location indication information includes a location offset of the first extension packet header to the standard packet header, the first extension packet header can be located in the first packet by directly offsetting the location offset based on the standard packet header.

It should be noted that, the foregoing description is provided by using only an example in which the information about the first extension packet header included in the first packet is obtained. For a second extension packet header other than the first extension packet header in the plurality of extension packet headers included in the first packet, similarly, information about the second extension packet header may be obtained in a manner of obtaining the information about the first extension packet header. Details are not described in this embodiment. In addition, after the information about the first extension packet header is obtained and the first extension packet header is obtained based on the information about the first extension packet header, a manner in which the first packet is processed based on the first extension packet header is not limited in this embodiment, and a processing manner may be selected based on an application scenario. For example, the processing manner includes, but is not limited to, skipping forwarding the first packet, discarding the first packet, forwarding the first packet, and the like.

Next, based on two different application scenarios, the packet header information obtaining method is described.

Application scenario 1: There may be a plurality of types for any extension packet header in the extension packet headers in the first packet. In a process of transmitting the first packet, a type of any extension packet header may need to be determined, and then a transmission manner of the first packet is determined based on the type of the extension packet header. For example, in the process of transmitting the first packet, the communications device needs to determine whether the first packet includes a compact routing packet header (compact routing header, CRH), and the CRH is one type of the RH. Based on a case in which the first packet includes the CRH, the first packet needs to be discarded, to ensure communication security.

In this application scenario, first, the extension packet header is located from the first packet based on the method provided in this embodiment, and a type of the extension packet header is determined by parsing the extension packet header, to determine a proper packet transmission manner. According to the appearance sequence defined in RFC8200, the standard packet header, the HBH, and the DOH may be included before the RH. According to a method provided in the related technology, the RH can be located only by sequentially parsing the standard packet header, the HBH, and the DOH. However, by applying the method provided in this embodiment, by using an example in which the extension header self-describing option is located in the $1^{st}$ extension packet header HBH, the extension header self-describing option can be obtained from the HBH after the standard packet header and the HBH are sequentially parsed. Afterwards, packet header information of the HBH, the DOH, and the RH may be obtained based on the extension header self-describing option, to locate the RH in the first packet. After the RH is parsed, whether the RH is a CRH may be determined, to further determine whether the first packet needs to be discarded.

Application scenario 2: The extension packet headers in the first packet carry different information. In a process of processing the first packet, information carried in one or more extension packet headers may need to be obtained. For example, TCP port information needs to be obtained in the process of processing the first packet.

Figure 11:
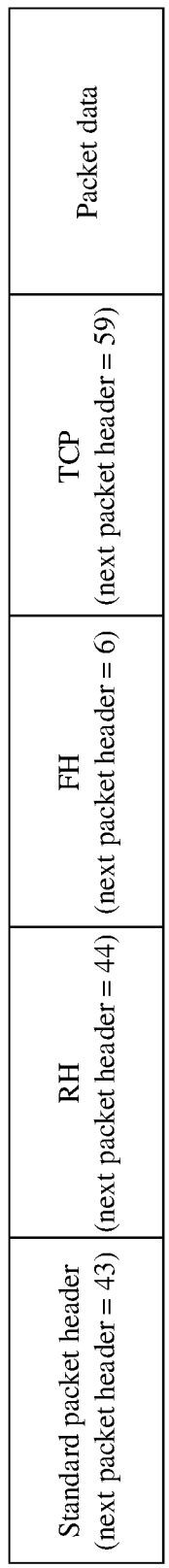
FIG. 11 is a format diagram of a first packet according to an embodiment.

Therefore, a TCP packet header may be first located from the first packet based on the method provided in this embodiment, and the TCP port information is obtained by parsing the TCP packet header. A first packet shown in FIG. 11 is used as an example. According to the method provided in the related technology, a TCP packet header can be located only by sequentially parsing a standard packet header, an RH, and an FH. However, by applying the method provided in this embodiment, by using an example in which the extension header self-describing option is located in the $1^{st}$ extension packet header RH, the extension header self-describing option can be obtained from the RH after the standard packet header and the RH are sequentially parsed. Afterwards, the packet header information of the extension packet headers is obtained from the extension header self-describing option, to directly locate the TCP packet header based on the packet header information, and the TCP port information can be obtained by parsing the TCP packet header.

In conclusion, in this embodiment, the packet header information of the extension packet headers in the first packet can be obtained by parsing the extension header self-describing option, without traversing all extension packet headers in the first packet, and an extension packet header that needs to be parsed can be directly located from the first packet by using the obtained packet header information. Therefore, not only efficiency of obtaining the packet header information is relatively high, but also hardware processing overheads are reduced. This avoids occurrence of a case in which the packet header information cannot be obtained due to a limitation of a hardware capability and is applicable to a service case in which a plurality of extension packet headers coexist in the first packet.

Figure 12:
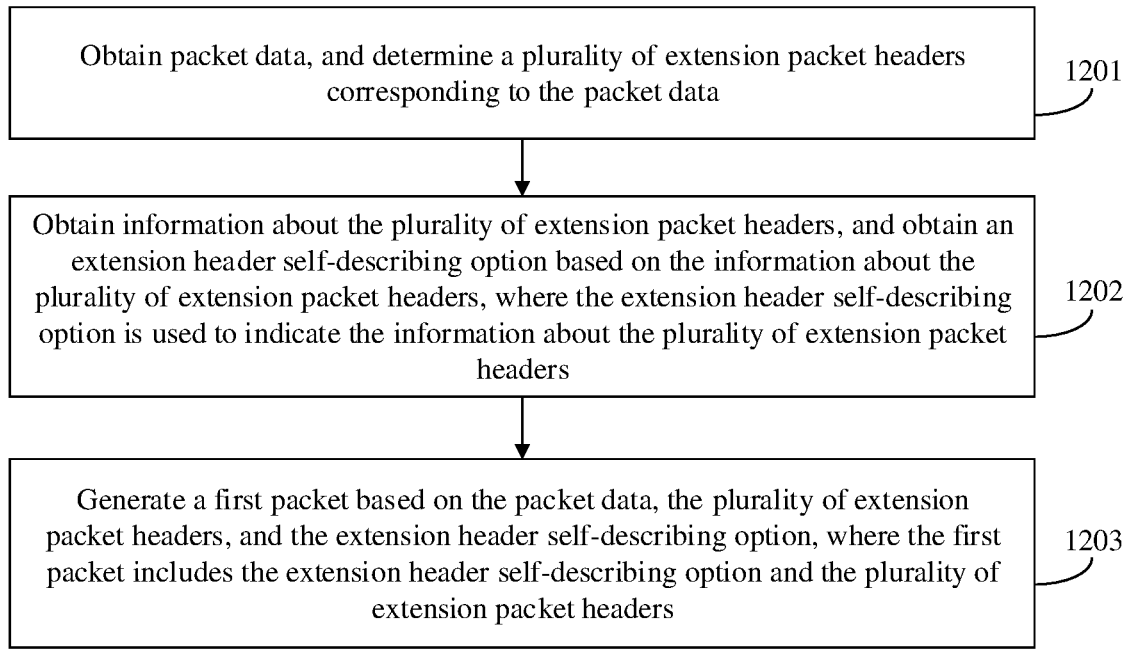
FIG. 12 is a flowchart of a packet generation method according to an embodiment.

A manner of obtaining the first packet is not limited in this embodiment and includes, but is not limited to, receiving the first packet by a current communications device from another communications device or generating the first packet by the current communications device. For a manner in which the current communications device generates the first packet, an embodiment may provide a packet generation method. As shown in FIG. 12, the method includes the following steps.

1201. Obtain packet data and determine a plurality of extension packet headers corresponding to the packet data.

The packet data is to-be-transmitted data between different communications devices. According to a requirement of a transmission protocol, a plurality of extension packet headers may be included before the packet data. For the extension packet headers, refer to the description in step 101. Details are not described herein again. For example, a standard packet header corresponds to the packet data. For the standard packet header, still refer to the description in step 101. Details are not described herein again.

1202. Obtain information about the plurality of extension packet headers and obtain an extension header self-describing option based on the information about the plurality of extension packet headers, where the extension header self-describing option is used to indicate the information about the plurality of extension packet headers.

The information about the extension packet headers includes type indication information and location indication information. For related descriptions, refer to the description in step 102. The information about the plurality of extension packet headers is encapsulated, so that the extension header self-describing option can be obtained. For a manner in which the extension header self-describing option carries the information about the extension packet headers, refer to the carrying manner 1 and the carrying manner 2 in step 102. Details are not described herein again.

1203. Generate a first packet based on the packet data, the plurality of extension packet headers, and the extension header self-describing option, where the first packet includes the extension header self-describing option and the plurality of extension packet headers.

For example, in a process of generating the first packet, the extension header self-describing option is located in any extension packet header in the plurality of extension packet headers. For fields in which the extension header self-describing option is located in different extension packet headers, refer to Table 2 and related descriptions of Table 2 in step 102. Details are not described herein again.

Alternatively, when a standard packet header corresponds to the packet data, the extension header self-describing option may also be located in the standard packet header. For a field in which the extension header self-describing option is located in the standard packet header, refer to Table 2 and related descriptions of Table 2 in step 102. Details are not described herein again. In this case, in this embodiment, the first packet is generated based on the packet data, the standard packet header, the plurality of extension packet headers, and the extension header self-describing option. The generated first packet includes the extension header self-describing option and the plurality of extension packet headers, and the plurality of extension packet headers are located after the standard packet header.

In this embodiment, another field may be added to the first packet to indicate the extension header self-describing option. For an indication manner, refer to the indication manner 1, the indication manner 2, and the indication manner 3 in step 102. Details are not described herein again. When the another field is added, the added field and the extension header self-describing option are located in a same field of a same packet header.

In conclusion, in this embodiment, the extension header self-describing option carries the information about the plurality of extension packet headers, and the extension header self-describing option is encapsulated into the first packet, so that a communications device that receives the first packet can directly obtain packet header information of the extension packet headers in the first packet based on the extension header self-describing option. Because there is no need to traverse all extension packet headers in the first packet, and the extension packet header that needs to be parsed can be directly located from the first packet by using the obtained packet header information, not only efficiency of obtaining the packet header information is relatively high, but also hardware processing overheads are reduced. This avoids occurrence of a case in which the packet header information cannot be obtained due to a limitation of a hardware capability and is applicable to a service case in which a plurality of extension packet headers coexist in the first packet.

Figure 13:
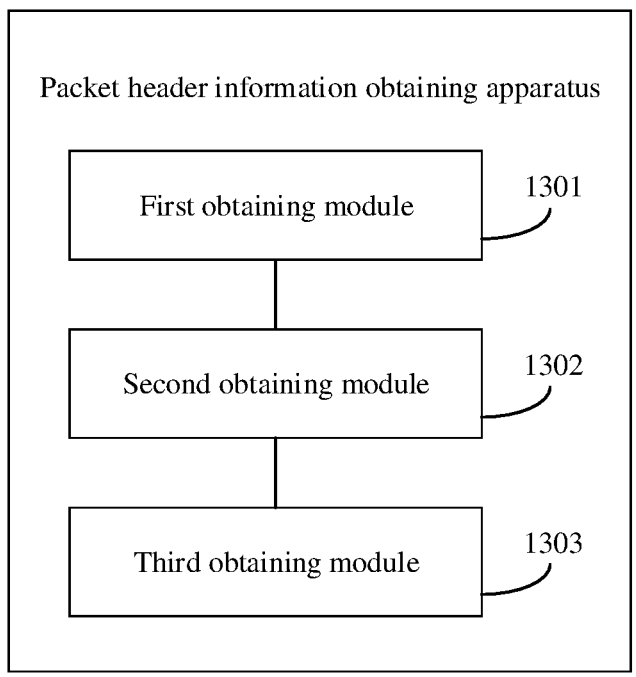
FIG. 13 is a schematic diagram of a structure of a packet header information obtaining apparatus according to an embodiment.

The foregoing describes the packet header information obtaining method in this embodiment. Corresponding to the foregoing method, an embodiment may further provide a packet header information obtaining apparatus. The apparatus is configured to perform, by using modules shown in FIG. 13, the packet header information obtaining method in FIG. 1. As shown in FIG. 13, the packet header information obtaining apparatus provided in this embodiment may include the following several modules: a first obtaining module 1301, a second obtaining module 1302, and a third obtaining module 1303.

The first obtaining module 1301 is configured to obtain a first packet, where the first packet includes a plurality of extension packet headers. For the step performed by the first obtaining module 1301, refer to the description in step 101.

The second obtaining module 1302 is configured to obtain an extension header self-describing option from the first packet, where the extension header self-describing option is used to indicate information about the plurality of extension packet headers. For the step performed by the second obtaining module 1302, refer to the description in step 102.

The third obtaining module 1303 is configured to obtain, based on the extension header self-describing option, a first extension packet header included in the plurality of extension packet headers. For the step performed by the third obtaining module 1303, refer to the description in step 103.

For example, the extension header self-describing option is located in a standard packet header included in the first packet.

For example, the extension header self-describing option is located in a flow label field of the standard packet header.

For example, the extension header self-describing option is located in any extension packet header in the plurality of extension packet headers.

For example, the extension header self-describing option is located in the $1^{st}$ extension packet header in the plurality of extension packet headers.

For example, the first packet further includes a first option type and a first option length. The first option type is used to indicate that the first packet includes the extension header self-describing option, and the first option length is used to indicate a length of the extension header self-describing option.

For example, the first packet further includes a second option type. The second option type is used to indicate that the first packet includes the extension header self-describing option, and the second option type is further used to indicate the length of the extension header self-describing option.

For example, the first packet further includes an option bitmap. The option bitmap includes an indication bit, and the indication bit is used to indicate that the first packet includes the extension header self-describing option.

For example, the extension header self-describing option includes a plurality of packet header information subfields, and the packet header information subfield includes type indication information of a corresponding extension packet header and location indication information of the corresponding extension packet header.

For example, the extension header self-describing option includes a template subfield and a location indication subfield. The template subfield is used to indicate an arrangement sequence of the plurality of extension packet headers. The location indication subfield includes location indication information of the plurality of extension packet headers arranged in the arrangement sequence.

For example, the template subfield further includes type indication information of the plurality of extension packet headers.

For example, the location indication information includes: a length occupied by the corresponding extension packet header, a location of the corresponding extension packet header in the first packet, a location offset of the corresponding extension packet header to a previous packet header, or a location offset of the corresponding extension packet header to the standard packet header included in the first packet.

For example, the third obtaining module 1303 is configured to: determine a packet header type of a to-be-found first extension packet header; determine type indication information corresponding to the packet header type of the first extension packet header; obtain information about the first extension packet header based on the type indication information of the first extension packet header and the extension header self-describing option; and obtain the first extension packet header from the first packet based on the information about the first extension packet header.

For example, the third obtaining module 1303 is configured to: determine, based on the information about the first extension packet header, location indication information that corresponds to the first extension packet header and that corresponds to the type indication information of the first extension packet header; and obtain the first extension packet header from the first packet based on the location indication information corresponding to the first extension packet header.

For the step performed by the third obtaining module 1303, refer to the description in step 103.

For example, the first packet is an IPv6 packet.

Figure 14:
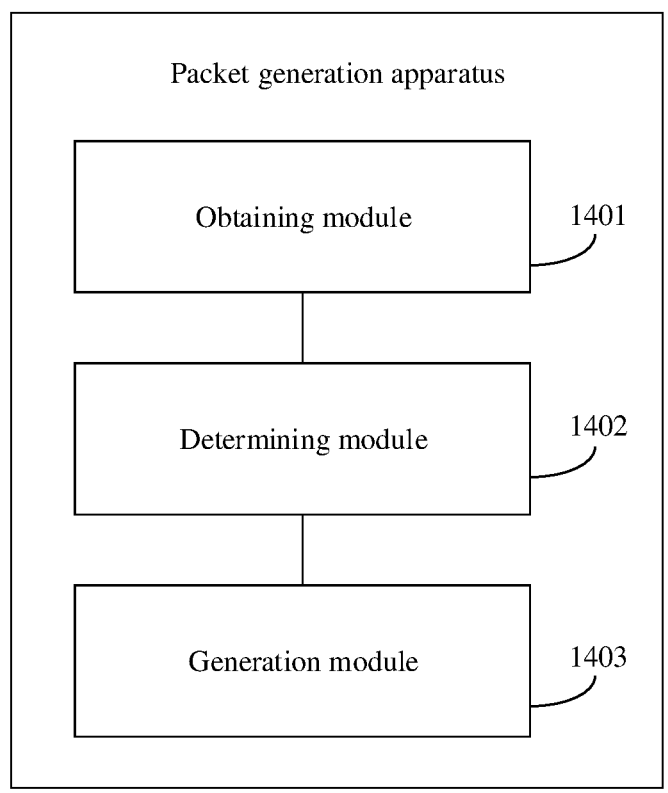
FIG. 14 is a schematic diagram of a structure of a packet generation apparatus according to an embodiment.

As shown in FIG. 14, an embodiment may further provide a packet generation apparatus. The apparatus includes:

an obtaining module 1401, configured to obtain packet data;

a determining module 1402, configured to determine a plurality of extension packet headers corresponding to the packet data;

the obtaining module 1401 is further configured to: obtain information about the plurality of extension packet headers, and obtain an extension header self-describing option based on the information about the plurality of extension packet headers, where the extension header self-describing option is used to indicate the information about the plurality of extension packet headers; and a generation module 1403, configured to generate a first packet based on the packet data, the plurality of extension packet headers, and the extension header self-describing option, where the first packet includes the extension header self-describing option and the plurality of extension packet headers.

For the steps performed by the obtaining module 1401, the determining module 1402, and the generation module 1403, refer to the descriptions of steps 1201 to 1203. Details are not described herein again.

It should be understood that, when the apparatuses provided in FIG. 13 and FIG. 14 implement functions of the apparatuses, division into the foregoing functional modules is merely used as an example for description. During actual application, the foregoing functions may be allocated to different functional modules for implementation based on a requirement. In other words, a device is divided into different functional modules in terms of an inner structure, to implement all or some of the foregoing functions. In addition, the apparatuses provided in the foregoing embodiments and the method embodiments are based on a same concept. For an implementation process, refer to the method embodiments. Details are not described herein again.

An embodiment may provide a communications device. The device includes a communications interface and a processor. Optionally, the communications device further includes a memory. The communications interface, the memory, and the processor communicate with each other through an internal connection path. The memory is configured to store instructions. The processor is configured to execute the instructions stored in the memory, to control the communications interface to receive a signal and control the communications interface to send a signal. In addition, when the processor executes the instructions stored in the memory, the processor is enabled to perform any example packet header information obtaining method provided in embodiments.

An embodiment may provide a communications device. The device includes a communications interface and a processor. Optionally, the communications device further includes a memory. The communications interface, the memory, and the processor communicate with each other through an internal connection path. The memory is configured to store instructions. The processor is configured to execute the instructions stored in the memory, to control the communications interface to receive a signal and control the communications interface to send a signal. In addition, when the processor executes the instructions stored in the memory, the processor is enabled to perform any example packet generation method provided in the embodiments.

Corresponding to the method embodiments and the virtual apparatus embodiments, an embodiment may further provide a communications device. The following describes a hardware structure of the communications device.

The communications device 1500 or the communications device 1600 described below corresponds to the communications device in the foregoing method embodiments, and hardware and modules in the communications device 1500 or the communications device 1600 and the foregoing other operations and/or functions are respectively for implementing various steps and methods performed by the communications device 1500 or the communications device 1600 in the method embodiments. For a detailed procedure of how the communications device 1500 or the communications device 1600 obtains packet header information or generates a packet, refer to the foregoing method embodiments for details. For brevity, details are not described herein again. The foregoing method steps 101 to 103 and method steps 1201 to 1203 are completed by using an integrated logic circuit of hardware in the processor of the communications device 1500 or the communications device 1600, or by using instructions in a form of software. The steps in the methods with reference to embodiments may be directly performed and completed by a hardware processor or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps in the foregoing methods in combination with hardware of the processor. To avoid repetition, details are not described herein again.

The communications device 1500 or the communications device 1600 corresponds to the packet header information obtaining apparatus or the packet generation apparatus in the foregoing virtual apparatus embodiments, and each functional module in the packet header information obtaining apparatus or the packet generation apparatus is implemented by software of the communications device 1500 or the communications device 1600. In other words, the functional module included in the packet header information obtaining apparatus or the packet generation apparatus is generated after the processor of the communications device 1500 or the communications device 1600 reads program code stored in the memory.

Figure 15:
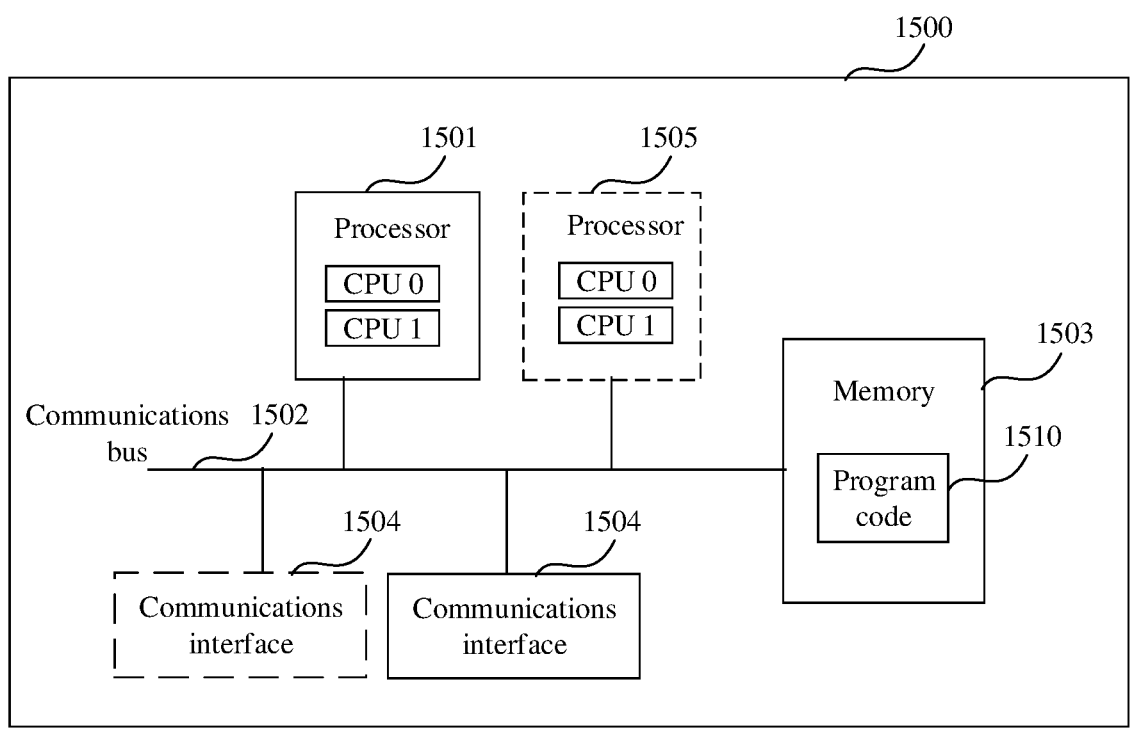
FIG. 15 is a schematic diagram of a structure of a communications device according to an embodiment.

FIG. 15 is a schematic diagram of a structure of a communications device 1500 according to an example embodiment. The communications device 1500 shown in FIG. 15 is configured to perform operations related to the packet header information obtaining method shown in FIG. 1 and the packet generation method shown in FIG. 12. The communications device 1500 is, for example, a switch, a router, a controller, or the like. The communications device 1500 may be implemented by a general bus architecture.

As shown in FIG. 15, the communications device 1500 includes at least one processor 1501, a memory 1503, and at least one communications interface 1504.

The processor 1501 is, for example, a general central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions. For example, the processor 1501 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor 1501 may implement or execute various logical blocks, modules, and circuits described with reference to content in the embodiments. Alternatively, the processor may be a combination of processors implementing a computing function, for example, a combination of one or more microprocessors, or a combination of a DSP and a microprocessor.

Optionally, the communications device 1500 further includes a bus. The bus is configured to transfer information between components of the communications device 1500. The bus may be a peripheral component interconnect (PCI) bus, an extended industry standard architecture (EISA) bus, or the like. Buses may be classified into an address bus, a data bus, a control bus, and the like. For ease of representation, only one thick line is used to represent the line in FIG. 15, but this does not mean that there is only one bus or only one type of bus.

For example, the memory 1503 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by the computer. However, the memory 1503 is not limited thereto. The memory 1503 exists independently, for example, and is connected to the processor 1501 through the bus. Alternatively, the memory 1503 may be integrated with the processor 1501.

The communications interface 1504 is any apparatus such as a transceiver and is configured to communicate with another device or a communications network. The communications network may be the Ethernet, a radio access network (RAN), a wireless local area network (WLAN), or the like. The communications interface 1504 may include a wired communications interface and may further include a wireless communications interface. The communications interface 1504 may be an Ethernet interface, a fast Ethernet (FE) interface, a gigabit Ethernet (GE) interface, an asynchronous transfer mode (ATM) interface, a wireless local area network (WLAN) interface, a cellular network communications interface, or a combination thereof. The Ethernet interface may be an optical interface, an electrical interface, or a combination thereof. In this embodiment, the communications interface 1504 may be used by the communications device 1500 to communicate with another device.

During implementation, in an embodiment, the processor 1501 may include one or more CPUs, such as a CPU 0 and a CPU 1 shown in FIG. 15. Each of the processors may be a single-core (single-CPU) processor or may be a multi-core (multi-CPU) processor. The processor herein may refer to one or more devices, circuits, and/or processing cores configured to process data (for example, computer program instructions).

During implementation, in an embodiment, the communications device 1500 may include a plurality of processors, for example, a processor 1501 and a processor 1505 shown in FIG. 15. Each of the processors may be a single-core processor (single-CPU) or may be a multi-core processor (multi-CPU). The processor herein may refer to one or more devices, circuits, and/or processing cores configured to process data (for example, computer program instructions).

During implementation, in an embodiment, the communications device 1500 may further include an output device and an input device. The output device communicates with the processor 1501 and may display information in a plurality of manners. For example, the output device may be a liquid crystal display (LCD), a light emitting diode (LED) display device, a cathode ray tube (CRT) display device, a projector, or the like. The input device may communicate with the processor 1501 and may receive an input from a user in a plurality of manners. For example, the input device may be a mouse, a keyboard, a touchscreen device, or a sensor device.

In some embodiments, the memory 1503 is configured to store program code 1510 for executing the solutions, and the processor 1501 may execute the program code 1510 stored in the memory 1503. In other words, the communications device 1500 may implement, by using the processor 1501 and the program code 1510 in the memory 1503, the packet header information obtaining method or the packet generation method provided in the method embodiments. The program code 1510 may include one or more software modules. Optionally, the processor 1501 may alternatively store program code or instructions for executing the solutions.

In an embodiment, the communications device 1500 in this embodiment may correspond to the communications device in the foregoing method embodiments, and the processor 1501 in the communications device 1500 reads the instructions in the memory 1503, so that the communications device 1500 shown in FIG. 15 can perform all or some of the operations performed by the communications device in the method embodiments.

The communications device 1500 may further correspond to the apparatus shown in FIG. 13, and each functional module in the apparatus shown in FIG. 13 is implemented by using software of the communications device 1500. In other words, the functional module included in the apparatus shown in FIG. 13 is generated after the processor 1501 of the communications device 1500 reads the program code 1510 stored in the memory 1503.

The communications device 1500 may further correspond to the apparatus shown in FIG. 14, and each functional module in the apparatus shown in FIG. 14 is implemented by using software of the communications device 1500. In other words, the functional module included in the apparatus shown in FIG. 14 is generated after the processor 1501 of the communications device 1500 reads the program code 1510 stored in the memory 1503.

The steps of the packet header information obtaining method shown in FIG. 1 and the packet generation method shown in FIG. 12 are completed by using an integrated logic circuit of hardware in the processor of the communications device 1500, or by using instructions in a form of software. The steps in the methods with reference to the embodiments may be directly performed and completed by a hardware processor or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps in the foregoing methods in combination with hardware of the processor. To avoid repetition, details are not described herein again.

Figure 16:
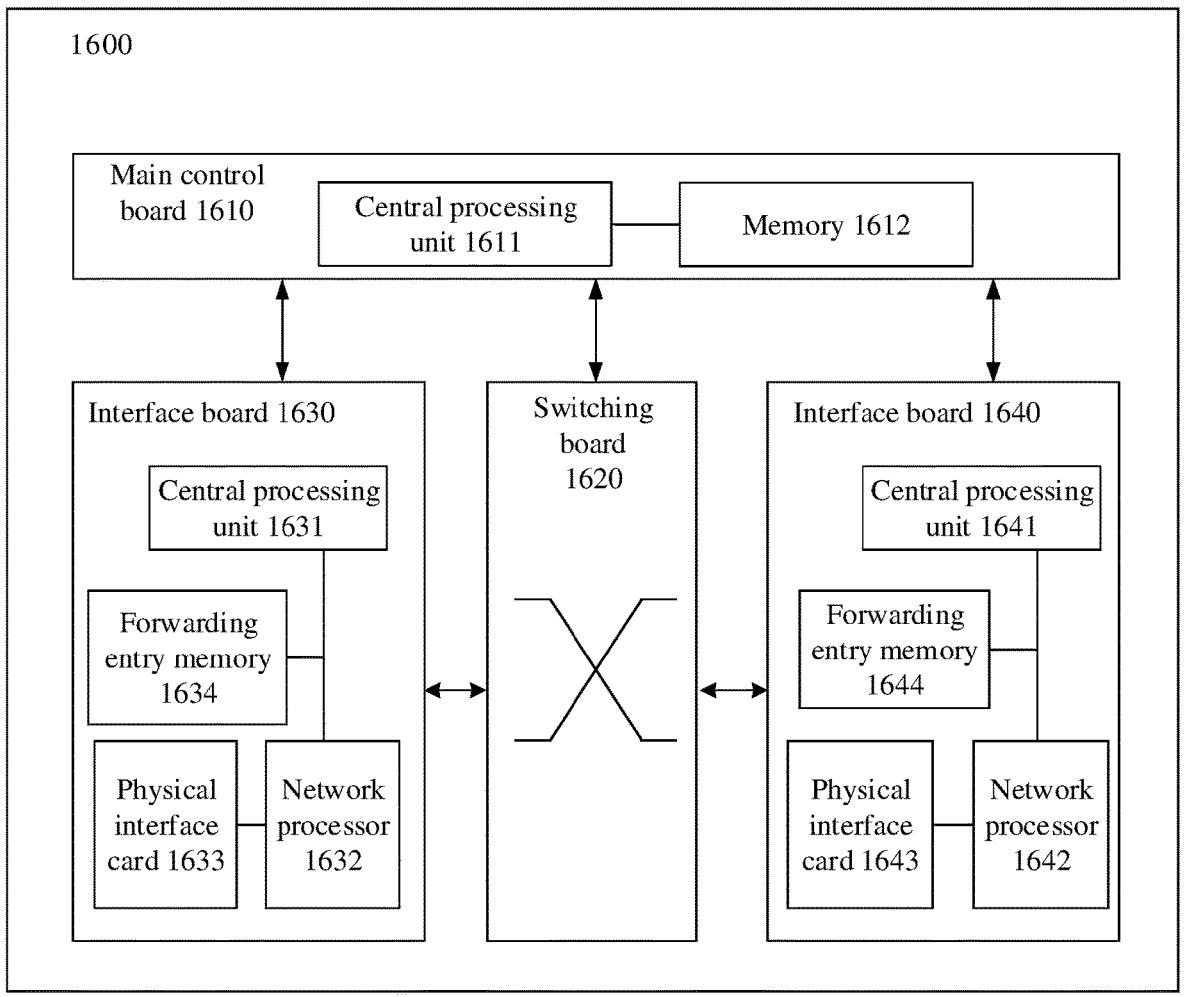
FIG. 16 is a schematic diagram of a structure of a communications device according to an embodiment.

FIG. 16 is a schematic diagram of a structure of a communications device 1600 according to an example embodiment. The communications device 1600 includes a main control board 1610 and an interface board 1630.

The main control board 1610 is also referred to as a main processing unit (MPU) or a route processor card. The main control board 1610 is configured to control and manage components in the communications device 1600, including functions of route calculation, device management, device maintenance, and protocol processing. The main control board 1610 includes a central processing unit 1611 and a memory 1612.

The interface board 1630 is also referred to as a line processing unit (LPU), a line card, or a service board. The interface board 1630 is configured to provide various service interfaces and forward a data packet. The service interface includes but is not limited to an Ethernet interface, a Packet over SONET/SDH (POS) interface, and the like. The Ethernet interface is, for example, a flexible Ethernet client (FlexE Client). The interface board 1630 includes a central processing unit 1631, a network processor 1632, a forwarding entry memory 1634, and a physical interface card (PIC) 1633.

The central processing unit 1631 on the interface board 1630 is configured to control and manage the interface board 1630 and communicate with the central processing unit 1611 on the main control board 1610.

The network processor 1632 is configured to implement forwarding processing of a packet. A form of the network processor 1632 may be a forwarding chip. The network processor 1632 may be configured to forward a received packet based on a forwarding table stored in the forwarding entry memory 1634. If a destination address of the packet is an address of the communications device 1600, the packet is sent to a CPU (for example, the central processing unit 1611) for processing. If a destination address of the packet is not an address of the communications device 1600, the forwarding table is searched for a next hop and an outbound interface that correspond to the destination address based on the destination address, and the packet is forwarded to the outbound interface corresponding to the destination address. An uplink packet is processed as follows: An inbound interface of the packet is processed, and the forwarding table is searched. A downlink packet is processed as follows: The forwarding table is searched, and so on.

The physical interface card 1633 is configured to implement a physical layer interconnection function. Original traffic enters the interface board 1630 by using the physical interface card 1633, and a processed packet is sent out from the physical interface card 1633. The physical interface card 1633, also referred to as a subcard, may be installed on the interface board 1630, and is responsible for converting a photoelectric signal into a packet, performing validity check on the packet, and forwarding the packet to the network processor 1632 for processing. In some embodiments, the central processing unit may also perform a function of the network processor 1632, for example, implement software forwarding based on a general-purpose CPU, so that the network processor 1632 is not required in the physical interface card 1633.

Optionally, the communications device 1600 includes a plurality of interface boards. For example, the communications device 1600 further includes an interface board 1640. The interface board 1640 includes a central processing unit

1641, a network processor 1642, a forwarding entry memory 1644, and a physical interface card 1643.

Optionally, the communications device 1600 further includes a switching board 1610. The switching board 1610 may also be referred to as a switch fabric unit (SFU). When the communications device has a plurality of interface boards 1630, the switching board 1610 is configured to implement data exchange between the interface boards. For example, the interface board 1630 and the interface board 1640 may communicate with each other by using the switching board 1610.

The main control board 1610 is coupled to the interface board 1630. For example, the main control board 1610, the interface board 1630, the interface board 1640, and the switching board 1610 are connected to a system backplane through a system bus for interworking. In a possible implementation, an inter-process communication protocol (IPC) channel is established between the main control board 1610 and the interface board 1630, and communication is performed between the main control board 1610 and the interface board 1630 through the IPC channel.

Logically, the communications device 1600 includes a control plane and a forwarding plane. The control plane includes the main control board 1610 and the central processing unit 1631. The forwarding plane includes components that perform forwarding, such as the forwarding entry memory 1634, the physical interface card 1633, and the network processor 1632. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 1632 searches the forwarding table delivered by the control plane to forward a packet received by the physical interface card 1633. The forwarding table delivered by the control plane may be stored in the forwarding entry memory 1634. In some embodiments, the control plane and the forwarding plane may be totally separated, and are not on a same device.

If the communications device 1600 is configured as a communications device configured to obtain packet header information, the physical interface card 1633 obtains a first packet including a plurality of extension packet headers.

If the communications device 1600 is configured as a communications device configured to generate a packet, after generating a first packet, the communications device 1600 sends, by using the physical interface card 1633, the first packet to a communications device configured to obtain packet header information.

In this embodiment, an operation on the interface board 1640 is consistent with an operation on the interface board 1630. For brevity, details are not described again. The communications device 1600 in this embodiment may correspond to the communications device in the foregoing method embodiments, and the main control board 1610 and the interface board 1630 and/or 1640 in the communications device 1600 may implement functions of the communications device and/or various steps implemented by the communications device in the foregoing method embodiments. For brevity, details are not described herein again.

It should be noted that, there may be one or more main control boards. When there may be a plurality of main control boards, the main control boards may include an active main board and a standby main board. There may be one or more interface boards. A stronger data processing capability of the communications device indicates a larger quantity of provided interface boards. There may also be one or more physical interface cards on the interface board. There may be no switching board, or there may be one or more switching boards. When there may be a plurality of switching boards, load sharing and redundancy backup may be implemented together. In a centralized forwarding architecture, the communications device may not need a switching board, and the interface board undertakes a service data processing function of an entire system. In a distributed forwarding architecture, the communications device may have at least one switching board, and data is exchanged between a plurality of interface boards by using the switching board, to provide a capability of exchanging and processing a large capacity of data. Therefore, a data access and processing capability of the communications device in the distributed architecture is greater than that of the device in the centralized architecture. Optionally, a form of the communications device may be only one card, that is, there is no switching board, and functions of the interface board and the main control board are integrated on the card. In this case, the central processing unit on the interface board and the central processing unit on the main control board may be combined into one central processing unit on the card, to perform functions obtained after the two central processing units are superposed. A device in this form (for example, a communications device such as a low-end switch or router) has a low data exchanging and processing capability. An architecture that is to be used may depend on a networking deployment scenario. This is not limited herein.

In some possible embodiments, the communications device may be implemented as a virtualized device.

For example, the virtualized device may be a virtual machine (VM) on which a program having a packet sending function is run, and the virtual machine is deployed on a hardware device (for example, a physical server). The virtual machine is a complete computer system that is simulated by using software, that has a complete hardware system function, and that runs in a totally isolated environment. The virtual machine may be configured as a first communications device or a second communications device. For example, the communications device may be implemented based on a general physical server with reference to a network functions virtualization (NFV) technology. The communications device is a virtual host, a virtual router, or a virtual switch. A person skilled in the art may virtually create, on a general physical server, a communications device having the foregoing functions with reference to the NFV technology. Details are not described herein again.

For example, the virtualized device may be a container, and the container is an entity used to provide an isolated virtualized environment. For example, the container may be a docker container. The container may be configured as the communications device. For example, the communications device may be created by using a corresponding image. For example, two container instances, respectively a container instance proxy-container 1 and a container instance proxy-container 2, may be created for a proxy-container by using an image of the proxy-container (a container that provides a proxy service). The container instance proxy-container 1 is provided as a communications device configured to obtain packet header information, and the container instance proxy-container 2 is provided as a communications device configured to generate a packet. When a container technology is used for implementation, the communications device may run by using a kernel of a physical machine, and a plurality of communications devices may share an operating system of the physical machine. Different communications devices may be isolated by using the container technology. A containerized communications device may run in a virtualized environment, for example, may run in a virtual machine, or a containerized communications device may directly run in the physical machine.

For example, the virtualized device may be a pod. The pod is a basic unit of Kubernetes (Kubernetes is an open-source container orchestration engine of Google and is briefly referred to as K8s) for deploying, managing, and orchestrating a containerized application. The pod may include one or more containers. All containers in a same pod may be deployed on a same host. Therefore, all the containers in the same pod may communicate with each other through the host and may share storage resources and network resources of the host. The Pod may be configured as the communications device. For example, a container as a service (CaaS), which is a container-based PaaS service, may be instructed to create a Pod and the Pod is provided as a communications device.

The communications device may be alternatively another virtualized device, which is not enumerated herein.

In some possible embodiments, the communications device may be alternatively implemented by a general-purpose processor.

For example, the general-purpose processor may be in a form of a chip. The general-purpose processor implementing the communication device may include a processing circuit, and an input interface and an output interface that are internally connected to and communicated with the processing circuit. The processing circuit is configured to perform the packet generation step in the foregoing method embodiments by using the input interface. The processing circuit is configured to perform the receiving step in the foregoing method embodiments by using the input interface. The processing circuit is configured to perform the sending step in the foregoing method embodiments by using the output interface. Optionally, the general-purpose processor may further include a storage medium. The processing circuit is configured to perform, via the storage medium, storage steps in the foregoing method embodiments. The storage medium may store instructions executed by the processing circuit. The processing circuit is configured to execute the instructions stored in the storage medium, to perform the foregoing method embodiments.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory and provide instructions and data for the processor. The memory may further include a non-volatile random access memory. For example, the memory may further store information about a device type.

The memory may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Figure 17:
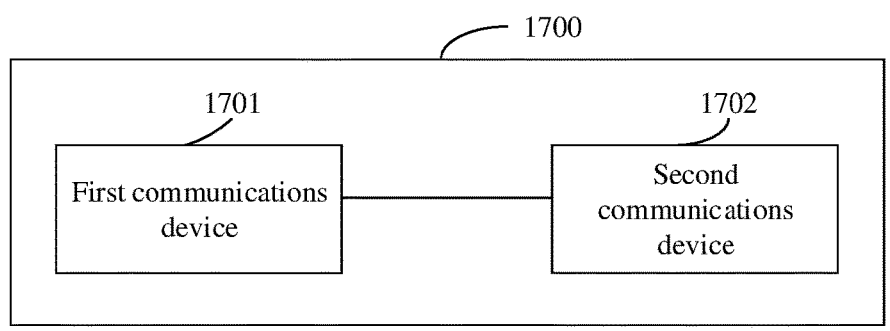
FIG. 17 is a schematic diagram of a structure of a communications system according to an embodiment.

As shown in FIG. 17, an embodiment may provide a communications system 1700. The communications system 1700 includes at least one communications device of a first communications device 1701 and a second communications device 1702. Optionally, the first communications device 1701 is a device for obtaining packet header information in any one of the foregoing possible implementations, and the second communications device 1702 is a device for generating a packet in any one of the foregoing possible implementations.

An embodiment may provide a computer program product. The computer program product includes computer program code. When the computer program code is run by a computer, the computer is enabled to perform the foregoing packet header information obtaining method shown in steps 101 to 103 and FIG. 1, or the foregoing packet generation method shown in steps 1201 to 1203 and FIG. 12.

An embodiment may provide a non-transitory computer-readable storage medium.

The non-transitory computer-readable storage medium stores a program or instructions. When the program or the instructions runs/run on a computer, the foregoing packet header information obtaining method shown in steps 101 to 103 and FIG. 1 is performed, or the foregoing packet generation method shown in steps 1201 to 1203 and FIG. 12 is performed.

An embodiment may provide a chip, including a processor, configured to invoke and run instructions stored in a memory, so that a communications device equipped with the chip performs the foregoing packet header information obtaining method shown in steps 101 to 103 and FIG. 1, or the foregoing packet generation method shown in steps 1201 to 1203 and FIG. 12.

An embodiment may provide another chip, including an input interface, an output interface, a processor, and a memory. The input interface, the output interface, the processor, and the memory are connected through an internal connection path. The processor is configured to execute code in the memory. When the code is executed, the processor is configured to perform the foregoing packet header information obtaining method shown in steps 101 to 103 and FIG. 1, or the foregoing packet generation method shown in steps 1201 to 1203 and FIG. 12.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions are all or partially generated. The computer may be a general-purpose computer, a dedicated computer, a computer network, or another programmable apparatus. The computer instructions may be stored in the non-transitory computer-readable storage medium The non-transitory computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

The non-transitory machine-readable medium may be any tangible medium containing or storing a program for or with respect to an instruction execution system, apparatus, or device. The non-transitory machine-readable medium may include, but is not limited to, an electronic, magnetic, optical, electromagnetic, infrared, or semiconductor system, apparatus, or device, or any suitable combination thereof. More detailed examples of the non-transitory machine-readable storage medium include an electrical connection with one or more wires, a portable computer disk, a hard disk drive, a random access memory (RAM), a read-only memory (ROM), an erasable programmable read-only memory (EPROM or a flash memory), an optical storage device, a magnetic storage device, or any suitable combination thereof.

It may be understood by a person skilled in the art that, for the purpose of convenient and brief description, for a detailed working process of the foregoing system, device, and module, refer to a corresponding process in the foregoing method embodiments. Details are not described herein.

In the several embodiments, it should be understood that the system, device, and method may be implemented in other manners. For example, the foregoing device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communications connections may be implemented by using some interfaces. Indirect couplings or communications connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments may be integrated into one processing module, or each of the modules may exist alone physically, or two or more modules may be integrated into one module. The integrated module may be implemented in a form of hardware or may be implemented in a form of a software functional module.

When the integrated module is implemented in the form of a software functional module and sold or used as an independent product, the integrated module may be stored in a non-transitory computer-readable storage medium. Based on such an understanding, the solutions essentially, or the part contributing to the prior art, or all or some of the solutions may be implemented in a form of a software product. The computer software product is stored in a non-transitory storage medium and includes several instructions for indicating a computer device (which may be a personal computer, a server, a network device, or the like) to perform all or some of the steps of the method described in the embodiments. The foregoing storage medium includes any medium that can store program code, such as a USB flash drive, a removable hard disk drive, a read-only memory (ROM), a random access memory (RAM), a magnetic disk, or an optical disc.

Terms such as "first" and "second" are used to distinguish between same items or similar items that have basically same functions. It should be understood that there is no logical or time sequence dependency between "first", "second", and "$n^{th}$", and a quantity and an execution sequence are not limited. It should also be understood that although terms such as first and second are used in the following description to describe various elements, these elements should not be limited by the terms. These terms may be used to distinguish one element from another element. For example, without departing from the scope of the various examples, a first image may also be referred to as a second image, and similarly, a second image may be referred to as a first image. Both the first image and the second image may be images, and in some cases, may be separate and different images.

It should be further understood that sequence numbers of the foregoing processes do not mean execution sequences in the various embodiments. The execution sequences of the processes should be determined based on functions and internal logic of the processes and should not be construed as any limitation on the implementation processes of embodiments.

The term "at least one" means one or more, and the term "a plurality of" means two or more. For example, "a plurality of second packets" means two or more second packets. The terms "system" and "network" may be often used interchangeably in this specification.

It should be understood that the terms used in the descriptions of the various examples are merely intended to describe examples but are not intended to constitute a limitation. The terms "one" ("a" and "an") and "the" of singular forms used in the descriptions of the various examples and the embodiments are also intended to include plural forms, unless otherwise specified in the context.

It should be further understood that the term "include" (also referred to as "includes", "including", "comprises", and/or "comprising") specifies presence of the stated features, integers, steps, operations, elements, and/or components, with presence or addition of one or more other features, integers, steps, operations, elements, components, and/or their groups not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based only on A. B may be alternatively determined based on A and/or other information.

It should be further understood that "one embodiment", "an embodiment", or "a possible implementation" means that particular features, structures, or characteristics related to embodiments or implementations are included in at least one embodiment. Therefore, "in one embodiment", "in an embodiment", or "in a possible implementation" does not necessarily refer to a same embodiment. In addition, these particular features, structures, or characteristics may be combined in one or more embodiments in any appropriate manner.

The foregoing descriptions are merely embodiments but are not intended to limit. Any modification, equivalent replacement, or improvement made without departing from the spirit and principle of the embodiments shall fall within the scope of the embodiments.

What is claimed is:

1. A network device, comprising:
at least one processor;
one or more memories coupled to the at least one processor and storing programming instructions, wherein the at least one processor is configured to execute the programming instructions to cause the network device to:
obtain a first packet, wherein the first packet comprises a plurality of extension packet headers;
obtain an extension header self-describing option from the first packet, wherein the extension header self-describing option is used to indicate information about the plurality of extension packet headers; and
obtain, based on the extension header self-describing option, a first extension packet header comprised in the plurality of extension packet headers.

2. The network device according to claim 1, wherein the extension header self-describing option is located in a standard packet header comprised in the first packet.

3. The network device according to claim 2, wherein the extension header self-describing option is located in a flow label field of the standard packet header.

4. The network device according to claim 1, wherein the extension header self-describing option is located in any extension packet header in the plurality of extension packet headers.

5. The network device according to claim 4, wherein the extension header self-describing option is located in the $1^{st}$ extension packet header in the plurality of extension packet headers.

6. The network device according to claim 1, wherein the first packet further comprises a first option type and a first option length; and
the first option type is used to indicate that the first packet comprises the extension header self-describing option, and the first option length is used to indicate a length of the extension header self-describing option.

7. The network device according to claim 6, wherein the extension header self-describing option comprises a plurality of packet header information subfields, and the packet header information subfield comprises type indication information of a corresponding extension packet header and location indication information of the corresponding extension packet header.

8. The network device according to claim 7, wherein the location indication information comprises a length occupied by the corresponding extension packet header, a location of the corresponding extension packet header in the first packet, a location offset of the corresponding extension packet header to a previous packet header, or a location offset of the corresponding extension packet header to a standard packet header comprised in the first packet.

9. The network device according to claim 6, wherein the extension header self-describing option comprises a template subfield and a location indication subfield, the template subfield is used to indicate an arrangement sequence of the plurality of extension packet headers, and the location indication subfield comprises location indication information of the plurality of extension packet headers arranged in the arrangement sequence.

10. The network device according to claim 9, wherein the template subfield further comprises type indication information of the plurality of extension packet headers.

11. The network device according to claim 1, wherein the first packet further comprises a second option type; and
the second option type is used to indicate that the first packet comprises the extension header self-describing option, and the second option type is further used to indicate a length of the extension header self-describing option.

12. The network device according to claim 1, wherein the first packet further comprises an option bitmap; and
the option bitmap comprises an indication bit, and the indication bit is used to indicate that the first packet comprises the extension header self-describing option.

13. The network device according to claim 1, comprising instructions that, when executed by the at least one processor, further cause the network device to:
determine a packet header type of a to-be-found first extension packet header;
determine type indication information corresponding to the packet header type of the first extension packet header;
obtain information about the first extension packet header based on the type indication information of the first extension packet header and the extension header self-describing option; and
obtain the first extension packet header from the first packet based on the information about the first extension packet header.

14. The network device according to claim 13, comprising instructions that, when executed by the at least one processor, further cause the network device to:
determine, based on the information about the first extension packet header, location indication information that corresponds to the first extension packet header and that corresponds to the type indication information of the first extension packet header; and
obtain the first extension packet header from the first packet based on the location indication information corresponding to the first extension packet header.

15. The network device according to claim 1, wherein the first packet is an internet protocol version 6 (IPv6) packet.

16. A network device, comprising:
at least one processor;
one or more memories coupled to the at least one processor and storing programming instructions, wherein the at least one processor is configured to execute the programming instructions to cause the network device to:
obtain packet data, and determine a plurality of extension packet headers corresponding to the packet data;
obtain information about the plurality of extension packet headers, and obtaining an extension header self-describing option based on the information about the plurality of extension packet headers, wherein the extension header self-describing option is used to indicate the information about the plurality of extension packet headers; and
generate a first packet based on the packet data, the plurality of extension packet headers, and the extension header self-describing option, wherein the first packet comprises the extension header self-describing option and the plurality of extension packet headers.

17. A communications system, wherein the communications system comprises a first communications device and a second communications device, the first communications device is configured to:
- obtain a first packet, wherein the first packet comprises a plurality of extension packet headers;
- obtain an extension header self-describing option from the first packet, wherein the extension header self-describing option is used to indicate information about the plurality of extension packet headers; and
- obtain, based on the extension header self-describing option, a first extension packet header comprised in the plurality of extension packet headers.

18. The communications system according to claim 17, wherein the extension header self-describing option is located in a standard packet header comprised in the first packet.

19. The communications system according to claim 18, wherein the extension header self-describing option is located in a flow label field of the standard packet header.

20. The communications system according to claim 17, wherein the extension header self-describing option is located in any extension packet header in the plurality of extension packet headers.

* * * * *